United States Patent [19]

Benschop et al.

[11] Patent Number: 5,584,000
[45] Date of Patent: Dec. 10, 1996

[54] ADDRESSING SCHEME FOR MICROCODE STORE IN A SIGNAL PROCESSOR

[75] Inventors: Nico F. Benschop; Josephus A. Huisken, both of Eindhoven, Netherlands

[73] Assignee: U.S. Philips Corporation, New York, N.Y.

[21] Appl. No.: 445,988

[22] Filed: May 22, 1995

Related U.S. Application Data

[63] Continuation of Ser. No. 62,874, May 17, 1993, abandoned.

[30] Foreign Application Priority Data

Jun. 15, 1992 [EP] European Pat. Off. .............. 92201738

[51] Int. Cl.$^6$ ........................................................ G06F 9/26
[52] U.S. Cl. ............... 395/387; 395/421.07; 395/421.08
[58] Field of Search ................................ 395/375, 428, 395/444, 421.07, 421.08

[56] References Cited

U.S. PATENT DOCUMENTS

| | | | |
|---|---|---|---|
| 3,634,883 | 1/1972 | Kreidermacher | 395/375 |
| 3,699,528 | 10/1972 | Carlson et al. | 395/775 |
| 3,938,096 | 2/1976 | Brown et al. | 395/419 |
| 3,949,378 | 4/1976 | Crabb et al. | 395/421.1 |
| 4,047,247 | 9/1977 | Stanley et al. | 395/421.1 |
| 4,155,120 | 5/1979 | Keefer et al. | 395/375 |
| 4,179,737 | 12/1979 | Kim | 395/375 |
| 4,240,139 | 12/1980 | Fukuda et al. | 395/421.05 |
| 4,285,049 | 8/1981 | Bird et al. | 395/483 |
| 4,511,966 | 4/1985 | Hamada | 395/775 |
| 4,511,983 | 4/1985 | Cassonnet et al. | 395/421.1 |
| 4,521,858 | 6/1985 | Kraemer et al. | 395/375 |
| 4,531,200 | 7/1985 | Whitley | 395/375 |
| 4,935,867 | 6/1990 | Wang et al. | 395/421.07 |
| 5,058,007 | 10/1991 | Feil | 395/375 |
| 5,282,275 | 1/1994 | Andre et al. | 395/421.1 |
| 5,377,335 | 12/1994 | Keller et al. | 395/375 |

OTHER PUBLICATIONS

J. Zegers et al., "CGE*: Automatic Generation of Controllers in the CATHEDRAL-II Silicon Compiler", European Design Automation Conference 1990, (EDAC 90), pp. 617-621.

Primary Examiner—Krisna Lim
Assistant Examiner—Viet Vu
Attorney, Agent, or Firm—Anne E. Barschall

[57] ABSTRACT

When the processing circuitry of a signal processor can handle data at a faster rate than the rate of arrival of signal units to be processed, the processor is able to execute a cycle of microcodes for each arriving signal unit. To generate the cycle, the signal processor contains base address reproducing means, for in each cycle reproducing a standard sequence of successive base addresses BA(i) (i=1 ... N). The base address reproducing means feed microcode selecting means for selecting, in step with each base address and under control of signal data received from the processing circuitry, an associated microcode address MA(i) from a repertory of microcode addresses indicated by the base address BA(i). Selection is implemented by adding each base address BA(i) to an associated index IA(i), determined in dependence on signal data received from the processing circuitry. Usually, the indices IA(i) require fewer bits than the base addresses BA(i); the indices are determined in codependence of the base address, or of a signal identifying a class to which the base address belongs. The signal data is collected from the processing circuitry via a shift register.

15 Claims, 3 Drawing Sheets

ADDRESSING SCHEME FOR MICROCODE STORE IN A SIGNAL PROCESSOR

This is a continuation of application Ser. No. 08/062,874, filed May 17, 1993 now abandoned.

BACKGROUND OF THE INVENTION

The invention relates to a time-discrete signal processor comprising a signal input for receiving a stream of signal units, address generating means for, in step with reception of each particular signal unit, generating an associated cycle of microcode addresses MA(i) (i=1, . . . ) for a microcode store for controlling processing circuitry for processing the signal unit.

Such a time discrete signal processor is known from an article titled "CGE: Automatic Generation of Controllers in the Cathedral II Silicon Compiler" by J. Zegers et at., published in the proceedings of the European Design Automation Conference 1990 (EDAC 90) pages 617–621.

In a time discrete signal processor a stream of discrete signal units is processed. Usually, the signal units are digital, but they may also take other forms, e.g. as analogue charges stored on capacitors, which represent time discrete samples of a signal. Each signal unit is subjected to various processing steps. For example, a typical time discrete signal processing function like filtering requires processing steps like storage of data from the signal units, later retrieval, multiplication with various filter coefficients, and summation of the products.

To execute the processing steps, the processing circuitry comprises a combination of functional units, selected from such components as for example signal busses, arithmetic logic units (ALUs), multipliers, memories, registers, pass gates etcetera.

For many applications, the maximum processing step execution rate of the processor is much greater than the rate at which signal units arrive. This means that it is possible to perform a cycle of many successive processing steps for each arriving signal unit, whereby parts of the processing circuit may be timeshared between different processing steps. In order to perform the required cycle of processing steps a succession of digital control signals needs to be applied to these functional units, for example to open or close pass gates, to program the function of an ALU or to retrieve a specific filter coefficient.

In the known time discrete signal processor, the digital control signals needed at respective instants in the cycle are stored as microcodes in respective addressable locations of a microcode store. By applying the address of a microcode to this store, the microcode is retrieved from it. This microcode is then applied as a control signal to the functional units. Thus, a cycle of addresses, applied to the microcode store, will lead to the execution of a signal processing function under direction of a cycle of control signals.

According to the prior art microcodes which have to be output successively are stored at successive locations. In this case, the cycle of addresses can be generated by means of an incrementing counter. This, however, does not provide for data dependent instruction execution. To accommodate data dependence, the prior an teaches the use of branching. This means that, at least at some branch points in the cycle the next address will not be determined by incrementing, but by branching, i.e by a conditional jump in the microcode address value.

For branching, the known time discrete signal processor contains branch logic for each branch point. This branch logic receives signal data, and from it determines whether a branch is to be executed, and selects the next address. The problem with the branch logic is that it is requires a lot of circuitry, because it must store for all branch points microcode addresses for all branch targets. Because of its complexity the branch logic will moreover tend to be slow.

SUMMARY OF THE INVENTION

Amongst others, it is an object of the invention to provide for a time discrete signal processor in which less circuitry is needed for address selection.

The time discrete signal processor according to the invention realizes the object because it is characterized, in that the address generating means comprise base address reproducing means, for in each cycle reproducing a standard sequence of successive base addresses BA(i) (i=1 . . . N), and arranged for feeding the base addresses BA(i) to microcode selecting means for selecting, in step with each base address and under control of signal data received from the processing circuitry, an associated microcode address MA(i) from a repertory of microcode addresses indicated by the base address BA(i).

In this way the processor is made reactive to signal data, that is, either directly to data in the signal units, or to data produced in the processing circuitry in dependence of the signal units.

The signal processor according to the invention is based on the insight that in time discrete signal processing most branches do not serve to begin alternative sequences of more than one address. The practical function of branches is rather to select from alternative microcode addresses for each step of the processing cycle independently: usually there is no correlation between the selections made for successive steps.

According to the invention this insight is used by introducing base address as an auxiliary to the microcode address. The base address represents the stage of the processing cycle reached, the microcode address the instruction selected for that stage. The reproduction of the base addresses and the indication of the repertory is performed using the base address. Therefore the selection of microcode addresses does not require knowledge of the microcode addresses selected at earler stages in the cycle. For each base address only one selection circuit is needed for selection of a next microcode address. In comparison, in the prior art, separate selection circuits were needed for each alternative "source" microcode address preceding the next microcode address to be selected.

An embodiment of the time discrete signal processor according to the invention is characterized in that the microcode selecting means comprise index selecting means, for selecting, under control of the signal data, an associated index IA(i), and index adding means, for adding the base address BA(i) and the selected associated index IA(i), a sum output of the index adding means being arranged for feeding the microcode addresses MA(i)=BA(i)+IA(i) to the microcode store.

The use of indices provides an easily implementable way of selecting from the repertory. The word "adding" as it is used herein for the index adding means must be construed broadly. Beside conventional aritmetic addition other forms of adding explicitly included are for example juxtaposition of base address bits and index bits and exclusive OR operations between base address bits and index bits.

An embodiment of the time discrete signal processor according to the invention is characterized, in that the index selecting means are arranged for selecting the associated index IA(i)=F(data,BA(i)) under co-control of its base address BA(i). Thus, in step with the base addresses through the cycle, the way the index is determined from the data changes. An exemplary implementation of this is the use of several index determining circuits, each providing a different signal data dependence. The outputs of these circuits are connected to a multiplexer, which selects one output under control of the base address.

A further embodiment of the time discrete signal processor according to the invention is characterized, in that it comprises class identifying means, arranged for forming with each reproduced base address BA(i) an associated class signal CL(BA(i)), identifying a class to which said base address belongs, the class signal determining said co-control IA(i)=F(data,CL(BA(i))). It has been found that in signal processing base addresses BA(X), BA(Y) in different stages X, Y of the cycle may use mutually identical relations between the index and data: F(data,BA(X))=F(data,BA(Y)) (for all data). In this embodiment this is exploited to reduce the circuitry in the index adding means even further. The base addresses are categorized into equivalence classes of base addresses. For the base addresses in one class mutually identical relations hold between index and data. The class identifying means are used to signal the class CL(BA(i)) to which the base address belongs. The circuitry for providing the proper relation between index and data can the be shared among the class. An example of reuse concerns the base addresses with only one corresponding microcode address (i.e. where only a single index is possible). In this case a fixed index, preferably zero, may be used. More advanced examples of reuse comprise cases where the dependence may produce one of several indices.

An embodiment of the signal processor according to the invention is characterized in that in it, the base addresses are all represented digitally by a number of basebits, the indices all being represented by a number of indexbits, the number of index bits being smaller than the number of base bits. The indices are usually selected from at most a few (maximally typically 4 or 8) alternatives. This may be used by placing the microcodes to be produced by different indices at adjacent locations such that only indices of small magnitude need to be added. As a consequence the representation of the indices requires fewer bits than the full microcode addresses. Since only indices, containing the number of index bits, need to be produced by the index adding means, the index adding means can be made much more compact and faster than branch logic that needs to store complete addresses.

When the standard sequence contains uniformly spaced base addresses, it can be reproduced simply by incrementing each base address by a fixed amount each time to determine a successor base address. In general, this fixed amount will be 2 to the power of the number of index bits. In case the number of different possible indices is not the same for all base addresses, this means that, for base addresses with smaller numbers of different possible indices, addressable locations in the microcode store must be left unused.

An embodiment of the time discrete signal processor according to the invention is characterized, in that the base address reproducing means comprise a chaining store and a feedback coupling from an output of the chaining store to a chaining address input, whereby each base address selects its successor base address, if any. In this way, the successive base addresses from any chosen sequence can be reproduced. In particular there is no restriction to uniformly spaced sequences, and one may avoid leaving unused microcode store locations. The base addresses themselves may be directly fed back to address the chaining store, or via the index adding means.

In conventional addition carry may occur. This will increase the delay between the arrival of signal data and the formation of the microcode address, in particular when carry through a large number of bits occurs. To decrease this delay, it is advantageous to choose the base addresses such that during addition only a small number, or even no, carry operations are required. This may be achieved for example by determining first which bits of the index to be added in a particular phase of the cycle may be non zero (in response to any possible signal data). Subsequently the associated base address for that particular phase of the cycle is chosen such that its bits are zero when their counterpart in the index may be non zero.

An embodiment of the time discrete signal processor according to the invention is characterized, in that the index adding means comprise an adder circuit with restricted carry. When the base addresses are selected to avoid carry between certain bits in the address, the carry circuitry may be restricted to only those bits between which carry may occur. In the extreme, when carry is avoided entirely, one may use a carry free adder. This results in a simpler and faster adder.

The signal processor may also be made faster by minimizing the circuitry between the point where data becomes available and the adding means. A further embodiment of the time discrete signal processor according to the invention achieves this because it comprises serial in/parallel out shift register means, with a shift input having a fixed preprogrammed coupling to the processing circuitry, for serially receiving processed signals, the shift register means having a parallel output coupled to the index adding means. This makes the processed signal from a plurality of states directly available for determination of the index. The structure of the index adding means can therefore be kept simple, and does not cause undue signal delays.

BRIEF DESCRIPTION OF THE DRAWING

These and other advantageous aspects of the time discrete signal processor will be described hereinafter using Figures, of which

DETAILED DESCRIPTION OF THE PREFERRED EMBODIMENTS

A time discrete signal processor architecture

Figure 1:
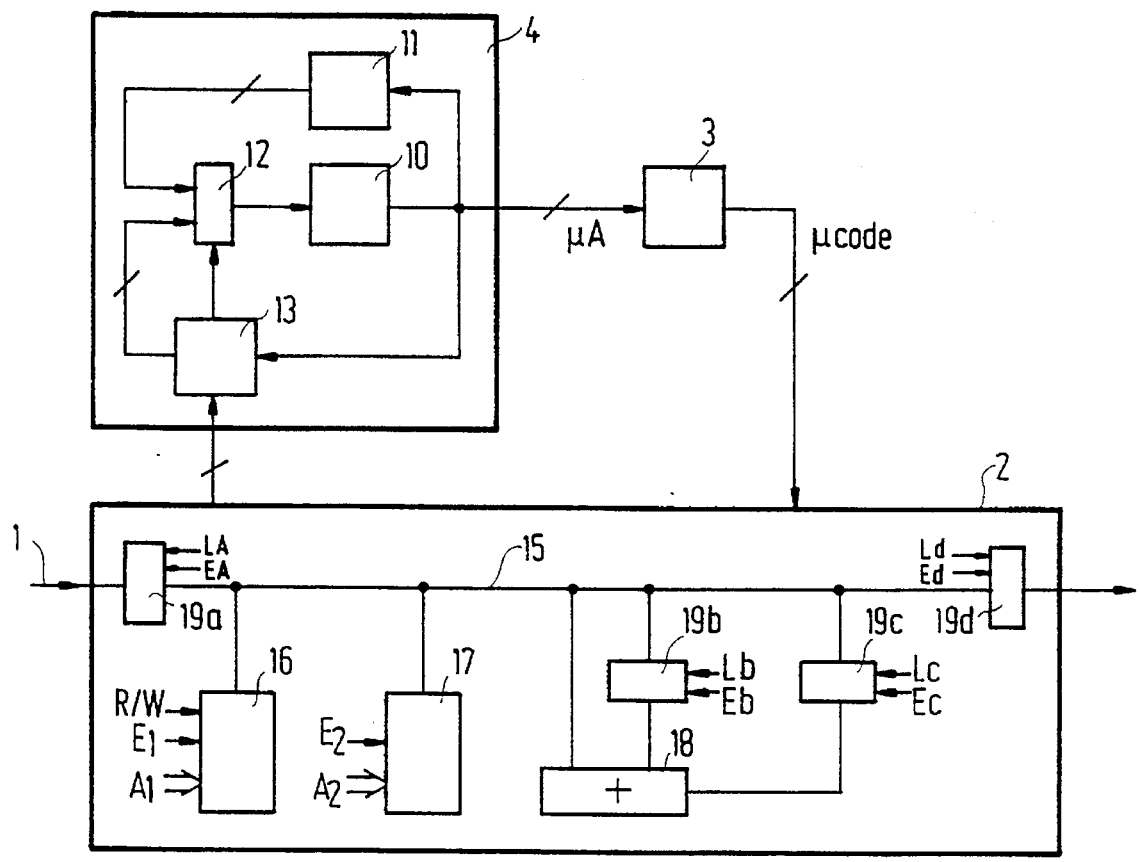
FIG. 1 shows a known time discrete signal processor architecture

FIG. 1 shows the overall architecture of a known signal processor. This processor has an input 1, and contains processing circuitry 2 for processing the signal received at the input. The precise nature of the processing circuitry 2 will differ between different signal processors. It depends on the kind of operation the processor is required to perform, its required speed, accuracy and cost. By way of a very simple example, the processing circuitry in FIG. 1 is shown to comprise a bus 15, a random access memory 16, a read only memory 17, an adding circuit 18 and various registers 19a, 19b, 19c, 19d. In practice, the signal processing circuitry may contain a plurality of such busses and circuits, and also other circuits like arithmetic logic units (ALUs), multiplexers, multipliers etc.

The state of the processing circuitry 2 can be programmed using binary control signals. In the example, the control signals include the address A1 submitted to the random access memory 16, a read/write and enable signal R/W, E1. Similarly, the read only memory needs an address A2, and an output enable E2. The registers 19a, 19b, 19c, 19d need signals La, Lb, Lc, Ld, to latch data and signals Ea, Eb, Ec, Ed to enable outputting of stored data.

In many signal processing applications, such as for example audio signal processing, the signal processing circuitry 2 can cope with control signals which change at a much faster rate (over 30 MHz) than the sampling rate (below 50 kHz), at which new signal units arrive at the input 1. This will still hold when each arriving signal unit comprises several samples, for example successive bytes making up one signal data word, successive right and left channel stereo samples, or frames containing transform coefficients of a stretch of signal. The speed difference makes it possible to use a cycle of control signals for each incoming signal unit. In this way any one part of the processing circuitry can be controlled to serve in several different operations in different phases of one cycle. In other words, such a part may be timeshared between such different operations.

The cycle of control signals is generated using a sequencer 4 and a microcode store 3, which is for example implemented as a ROM (Read Only Memory). The sequencer 4 generates a sequence of microcode addresses, which is supplied to an address input of the microcode ROM 3. In response thereto the microcode ROM 3 outputs microcodes, which form the control signals for the processing circuitry. These control signals are submitted to the various parts of the processing circuitry by connections not shown in FIG. 1. Usually, the output of the microcode ROM 3 is much wider than its address inputs. In a typical example, the latter is 8 bits wide, and the former 100 bits or more.

In many signal processing operations, the sequence of addresses generated by the sequencer 4 will be generated in dependence on the signal data in the processor. A known way to implement this is shown in FIG. 1. Here, the sequencer 4 contains a program count latch 10, which outputs the microcode address to the microcode ROM 3. The program count latch 10 is updated periodically under control of a clock (not shown). The next address is normally determined by incrementing the contents of the program count latch 10, using an incrementer 11, which submits an incremented version of the program,.counter latch 10 output to its input via a multiplexer 12.

At some values of the program count, however, the multiplexer 12 is switched to supply the next program count from branch logic 13. The branch logic 13 has control inputs for receiving data from the processing circuitry. Under control of this data, it determines whether a deviation from incrementing is required and signals this to the multiplexer 12, If this is the case it also provides the next address. In this way an alternative sequence of addresses can be initiated, which will thereafter continue to run under control of the incrementer.

As described here the branch logic 13 operates in parallel with the processing circuitry: the address may branch immediately after any instruction. In other words, there are no separate branch instructions, in which the signal processor devotes itself exclusively to branching. This is conventional in signal processors and makes for high operation speed.

When there are many deviations from incrementing, the branch logic will be very complex. This is because they need to recognize for each microcode address the conditions under which deviation from normal incrementing must occur, and to store the deviating addresses. Because of this complexity, the branch logic will cause a delay in the speed with which the sequencer can react to signal data.

Signal processing operations.

As an example of a signal processing operation, consider a recursive division. Here, successive remainders $R_n$ are formed from the numerator N by subtracting successive shifted versions of the denominator D. Subtraction is dependent on the condition whether the shifted version of the denominator exceeds the remainder:

$$R_0=N$$

$$R_{n+1}=R_n-D*2^{-n}$$

or $$R_{n+1}=R_n$$

Similar signal dependencies occur when multiplication of two multiplicands $M_1$, $M_2$ is implemented using summing:

$$S_0=0$$

$$S_{n+1}=S_n+M_1*2^n$$

or $$S_{n+1}=S_n$$

The choice in the "or" depending on the $n^{th}$ bit of the second multiplicand $M_2$.

The alternative assignments, for example to $R_{n+1}$, are conventionally implemented by providing alternative sets of microcodes, one for calculating and assigning $R_n-D*2^{-n}$ and one performing the assignment of $R_n$. The sequence of microcode addresses is then adapted to address one of these sets, dependent on whether the condition (for example denominator exceeds remainder) occurs. A conventional way of achieving this is to set the program count to an alternative address (that is, to perform a so called branch) when this condition occurs, after which the program counter will reproduce the addresses subsequent to this alternative address.

Signal processors usually perform several processing operations (multiplications, additions divisions etc.) in parallel, more or less independently of each other. The microcodes will contain control signals to control all of these in parallel. As a consequence, several conditional branches of the type described above may occur in the sequence of microcodes shortly after each other or even simultaneously, even though they arise from independent operations. The resulting branch pattern may be quite complex and it requires a lot of circuitry to implement.

However, it has been found that in many signal processing operations the deviation from the normal sequence of microcode addresses due to branching will last only for a single address. Hence, no real branch to a persistent alternative sequence of addresses is needed, but only a single side step, or alternative, of the standard sequence. In the division discussed above, for example, alternatives for a single instruction, selecting either $D*2^{-n}$ or 0 as subtractand will suffice. (It may appear that processing time is wasted in case $D*2^{-n}$ is calculated when only 0 is actually used. However a signal processor needs to perform real time operations, i.e. operations which take the same time irrespective of the signal value. Hence the time that would be gained by not calculating $D*2^{-n}$ could not be used anyway in a signal processor).

Figure 2:
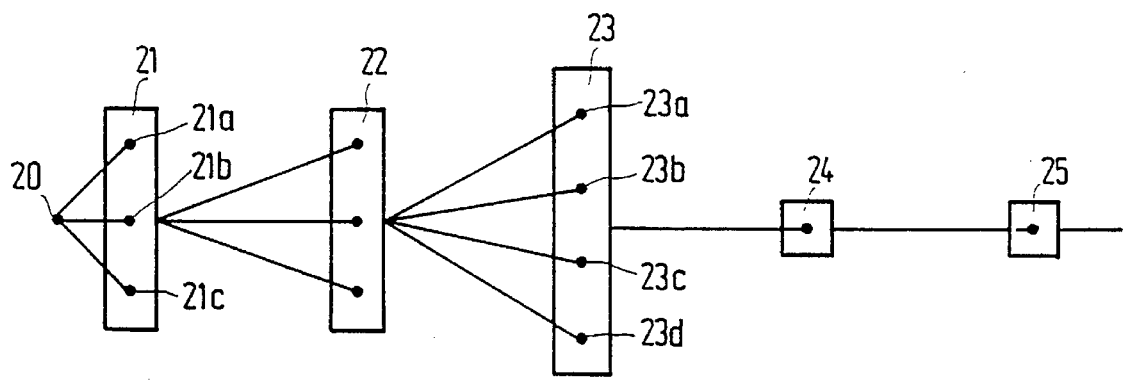
FIG. 2 shows a state diagram for a signal processing operation

This side step structure is illustrated in FIG. 2. This shows a state diagram for a typical signal processing operation. Each node 20, 21a, 21b, 21c, 22a, 22b, 22c, 23a, 23b, 23c, 23d, 24, 25 symbolizes a microcode address output to obtain a specific microcode and thus obtain a specific state of the processing circuitry. Each of the alternative addresses (e.g. 21a, 21b, 21c) in one box (e.g. 21) represents an alternative operation, such as for example selecting either 0 or $D*2^{-n}$ for subtraction in the division example. Time flow during processing is symbolized from left to right: in a first timeslot a first address 20 is produced. In a second timeslot one of three addresses 21a, 21b, 21c is produced. Similarly, in a third and fourth timeslot, one of respectively three 22a, 22b, 22c or four 23a, 23b, 23c, 23d addresses is produced. In a fifth and sixth timeslot only one address 24, 25 is possible.

Since the side steps last only for one instruction, the selection made in each time step is independent from the one made in its predecessor. The predecessor independence is symbolized by the arrows leaving the boxes 21, 22, 23, which emerge from a single exit, i.e. an exit which is indiscriminate for the various alternative addresses inside the box just exited. It should be noted that the exit itself does not itself correspond to an additional microcode address: the microcode address (21a, 21b or 21c) from timeslot 21 is immediately followed by that from timeslot 22 (microcode address 23a, 23b, 23c).

The time discrete signal processor according to the invention exploits the structure of the state diagram (FIG. 2) by using an architecture in which the microcode addresses in each box 22, 23, 24 are obtained by using a base address specific for the box and using signal data to select one address from the repertory of microcode address in the box 22, 23, 24. Each base address itself is used to determine its successor, which therefore does not depend on the microcode actually selected from the box.

Address generation by adding an index

Figure 3:
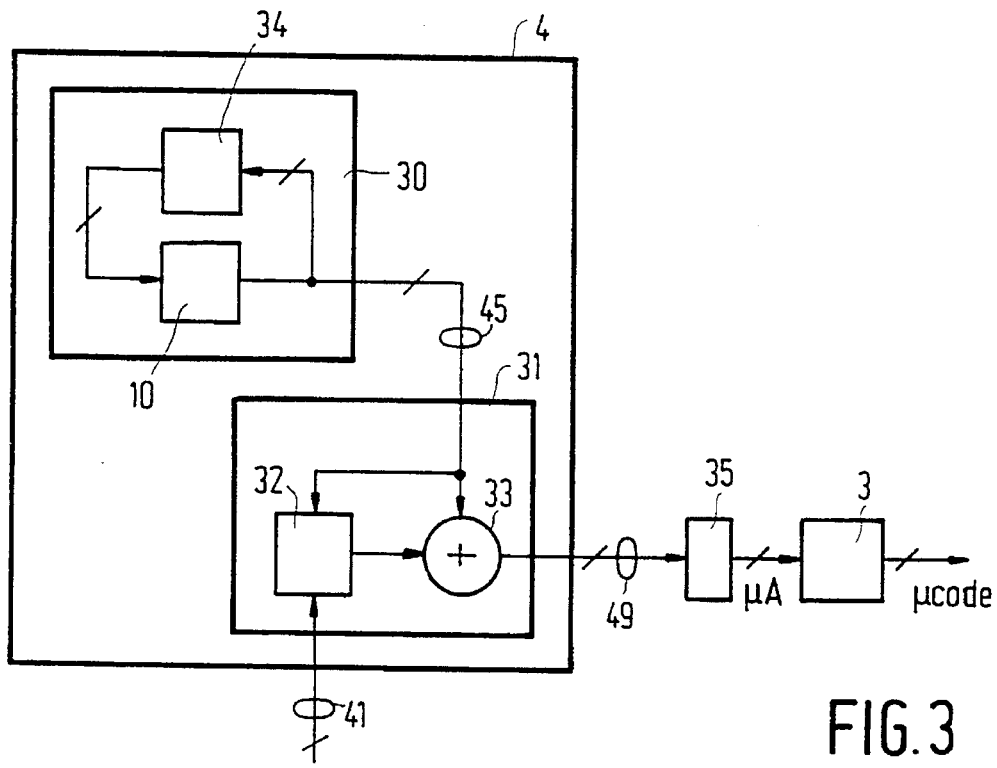
FIG. 3 shows address generating means for a signal processor according to an embodiment of the invention

FIG. 3 shows address generating means 4 according to the invention. They contain base address reproduction means 30 and microcode selecting means 31. The base address reproduction means 30 contain the program count latch 10 and next base address generation means 34. In normal operation the program count latch 10 is initialized to a standard initial address at the beginning of each cycle, by initializing means not shown in the Figure. After that, the content of the program count latch 10 follows a standard sequence of base addresses, by taking over the next base address provided by next address generation means 34. This is done under control of a clock signal (not shown in the Figure).

The microcode selecting means 31 have an input 41 which receives signal data from the processing circuitry 2. This signal data controls the selection of the microcode address from a repertory defined by the base address.

In an embodiment of the invention the signal data is fed to index determining means 32, which determine an index IA depending on of the signal data IA=F(data) and feed this index as a first operand to the index adding means 33. The base addresses are fed as second operand to the index adding means 33. In this way each base address BA provided on an address line 45 is added to an associated index. The sum forms the microcode address MA=BA+IA and is fed on a microcode address line 49 to the microcode ROM 3 (via a microcode address register 35).

The index IA is determined depending on the signal data. In many cases the way the index depends on the signal data will change throughout the cycle of instructions. To implement this, in FIG. 3 the kind of dependence is specified by the base address, which is fed to the index determining means 32 for the purpose of modifying the data dependence of the index: IA=F(data,BA).

Figure 4:
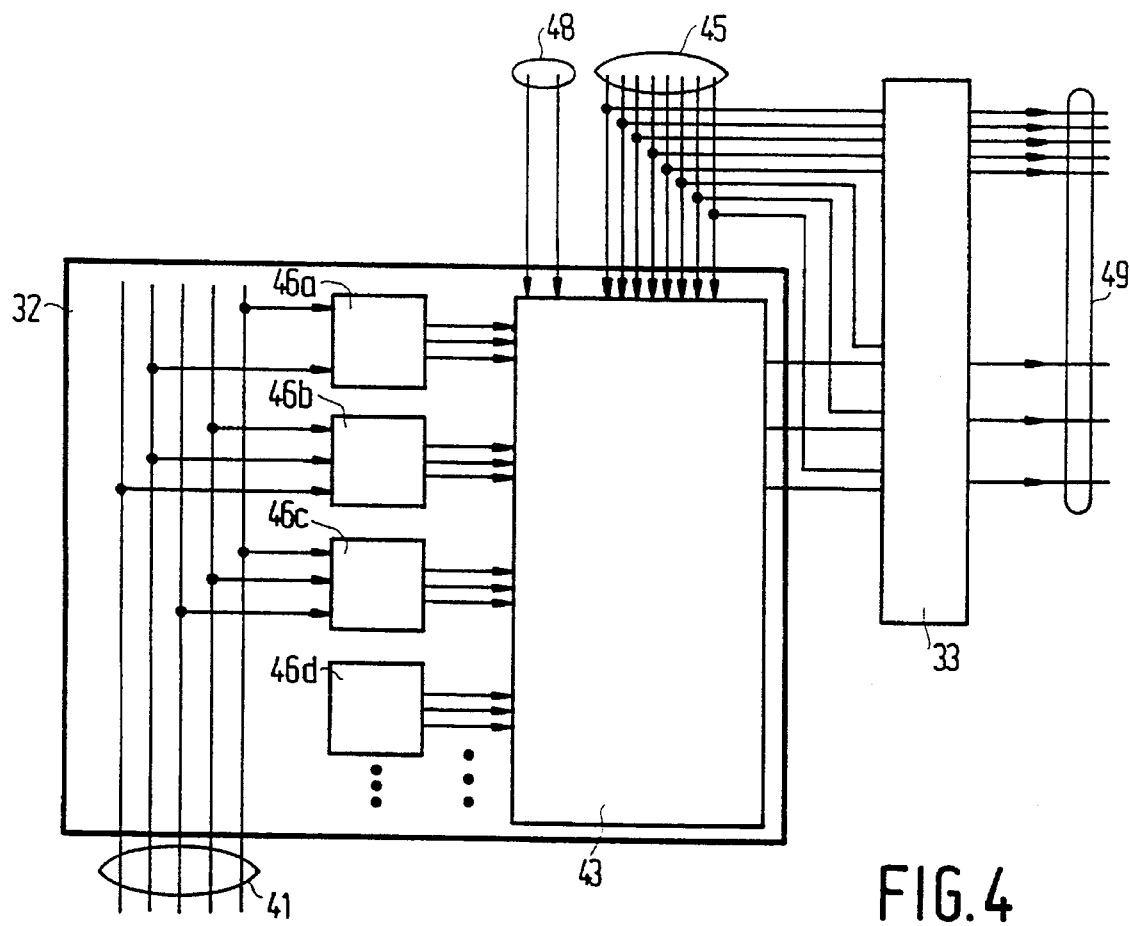
FIG. 4 shows an embodiment of a circuit for generating data dependent indices

FIG. 4 shows an embodiment of a circuit for implementing this data dependence. In this embodiment the index determining means 32 contain respective index determining circuits 46a, 46b, 46c . . . (one for each respective base address). Each circuit 46a, 46b, 46c is coupled to those of data lines 41 it needs for determining the index and each produces a three bit index (the number 3 being by way of example only), coupled to a multiplexer 43. The multiplexer 43 selects the bits of one of these indices and couples them to the adder 33. The index determining circuits 46a, 46b . . . may be implemented as any logic circuit having the desired response. A very simple implementation is a ROM storing a table of indices where the data is supplied to the address inputs.

For example, for the base address which corresponds to box 21 in FIG. 2, the index determining circuit 46a will be specified to generate one of three indices (with a specified method of determining the index from the signal data), which correspond to the three alternative states in the box 21. Similarly for box 22 there is an index determining circuit 46b which may produce three possible index values. For box 23 four index values may be produced, for 24 and 25 only one (each box having its own specified method of determining the index from the signal data).

In the embodiment according to the Figure the multiplexer 43 is directly under control of the base address on the address lines 45 and optionally under control of a class signal on a class signal line 48 (which will be explained below). When the class signal is not used the multiplexer needs an index input for each base address.

However, it has been found that for many different base addresses the index determining circuits can be made mutually identical. This may for example be the case when these different base addresses direct the execution of similar processing operations. Accordingly, one may define respective classes of base addresses, by the fact that the base addresses in each respective class require identical index determining circuits.

This may be exploited feeding the base address 45 to the multiplexer 43 via a class identifying circuit, which receives the base address 45 and produces a class signal identifying to which class the base address belongs. The class signal controls the multiplexer 43. Index determining circuits 46a, 46b and connections to the multiplexer 43 are then needed only for respective classes of base addresses.

One example of a class is the class of all addresses for which only one index (usually zero) is specified, irrespective of the data. Another example occurs when similar data dependent operations have to be performed in different parts of the cycle. Use of selection by class makes it possible to use one connection of an index determining circuit to the multiplexer 48 in these different parts of the processing cycle.

In practice, it has been found that there will usually be only a few classes which contain more than one base address, the most notable among these being the class for which the only index is zero. When there are only a few classes containing more than one base address, it has been found to be more advantageous to have the next base address generating means 34 produce part of the class identifying signal as well, and to store this part in a class signal store, at the same time when the next base address is stored in the program count latch 10. In this case the optional input 48 to the multiplexer is used to supply the stored part. The value of the stored part signals to the multiplexer which class is to be used, irrespective of the base address. Only for one exceptional value of the stored part, used in case of a class which contains only one address, the stored part signals the multiplexer to use the base address 45 to control selection of the index.

Of course the use of multiple index determining circuits 46a, 46b coupled to a multiplexer 43 is only an example of an implementation for the index determining means 32. Alternatives include multiple circuits 46a, 46b which themselves receive part or whole of the base address or the class signal, and modify their response to the data under control of this pan or whole.

Microcodes and next base addresses.

For each alternative microcode address a corresponding microcode is stored in the microcode ROM 3. The following is an example of a storage scheme for the state diagram of FIG. 2

| 1  | 2   | 3   | 4   | 5   | 6   | 7   | 8   | 9   | 10  | 11  | 12 | 13 |
|----|-----|-----|-----|-----|-----|-----|-----|-----|-----|-----|----|----|
| 20 | 21a | 21b | 21c | 22a | 22b | 22c | 23a | 23b | 23c | 23d | 24 | 25 |

Here the first row gives the address in the microcode ROM 3. The second row gives a reference to the addresses of FIG. 2. In order to produce the state diagram of FIG. 2, the base address reproducing means may reproduce the following sequence of base addresses:

| 1 | 2 | 5 | 8 | 12 | 13 |
|---|---|---|---|----|----|

The index determining means form indices successively selected from the following groups:

| 1   | 2     | 5     | 8       | 12  | 13  |
|-----|-------|-------|---------|-----|-----|
| (0) | (0,1,2) | (0,1,2) | (0,1,2,3) | (0) | (0) |

(the upper row gives the base address, the lower row the index domain specified by this base address).

In the example, the base addresses have been chosen consecutively: the first base address is 1, the second base address is the first address after the microcode addresses producible by addition of an index to the first base address, i.e. at 2. Similarly the third base address is the first after the microcode addresses producible by addition of an index to the second base address, i.e. at 5. Of course this selection scheme may be varied: if the range of indices is chosen differently, for example starting above zero, the base addresses must be moved accordingly. Nor is it imperative to order the values of the base addresses in order of occurrence in the standard cycle.

The sequence of base addresses may be reproduced using a base address ROM by way of next base address generating means 34. This ROM 34 stores the base addresses of the sequence (1,2,5,8,12,13), each at a location which has the address of its predecessor.

The following table shows the contents of this ROM 34 for implementing the state diagram of FIG. 2. The top row indicates the address of a location, the bottom row its content.

| 1  | 2 | 3 | 4  | 5 | 6 | 7   | 8  | 9  | 10 | 11  | 12  |
|----|---|---|----|---|---|-----|----|----|----|-----|-----|
| 4* | 4 | 4 | 7* | 7 | 7 | 11* | 11 | 11 | 11 | 12* | 13* |

When the ROM is addressed directly with the base addresses, only the locations marked with an asterisk "*" are needed. This is the situation for the architecture shown in FIG. 3. In an alternative architecture (not shown in FIG. 3), one may feed the microcode addresses (that is, the output of the adder 33) instead of the base addresses to address the next base address generating ROM 34. In this case all locations shown in the table need to be filled, and the program count latch 10 may be omitted. Locations which correspond to microcode addresses from the repertory of one base address all contain the same next base address. The use of microcode addresses has the advantage that the next base address generating ROM 34 can use the decoding logic for the microcode ROM 3.

Figure 5:
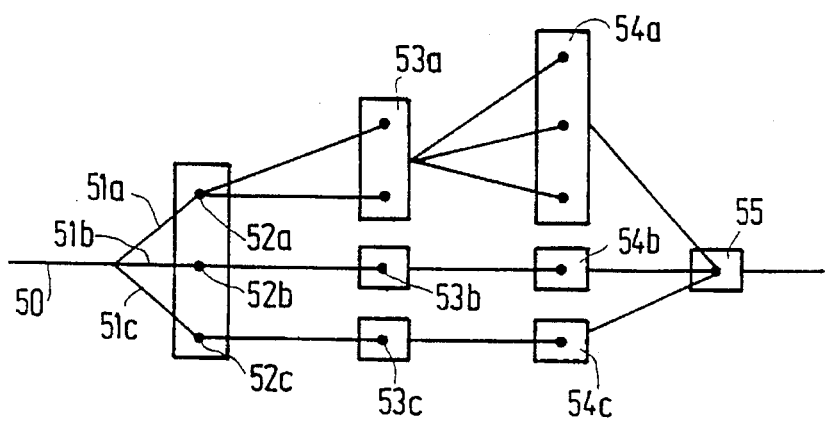
FIG. 5 shows a further state diagram

An additional advantage is that in exceptional cases use of alternative sequences can also be handled: this is illustrated in FIG. 5. This Figure shows a state diagram similar to that of FIG. 2, but having three alternative address sequences of equal duration, only one of which will be executed in each cycle. Such alternatives may follow upon a sequence 50 which is standard for each cycle, and which may for example be of the type shown in FIG. 2. The three branches 51a, 51b, 51c of FIG. 5 represent alternatives. Choice of one alternative is followed by execution of a corresponding one of three alternative sequences, represented by sequences of boxes (52a, 53a, 54a), (52b, 53b, 54b) or (52c, 53c, 54c)). Each box corresponds to a particular base address, to which indices may again be added in order to select one of the addresses in the box to form a microcode address.

The branches are entered by addressing a next base address ROM 34 using microcode addresses, alternative next base addresses being stored at addresses which correspond to different indices.

The following table shows a content of the next address ROM which realizes the state diagram of FIG. 5.

| 1 | 2 | 3  | 4  | 5 | 6 | 7  | 8  | 9  | 10 | 11 | 12 | 13 | 14 |
|---|---|----|----|---|---|----|----|----|----|----|----|----|----|
| 2 | 5 | 10 | 12 | 7 | 7 | 14 | 14 | 14 | 11 | 14 | 12 | 14 | 15 |

The top row contains the address of the location, the bottom row contains the next address, i.e. the content of the location. The locations 2, 3 and 4 correspond to the first states 52a, 52b and 52c of the three branches 51a, 51b, 51c. These states are addressed with a common base address (obtained from location 1), by adding one of the indices (0,1,2). Note that these locations 2, 3, 4, contrary to what occurred in FIG. 4, contain different next base addresses. This causes the base addresses to follow alternative sequences (2,5,7,14), (2,10, 11,14) or (2,12,13,14) depending on which microcode address was generated in the first states (either 52a, 52b or 52c) when the base address was 2.

In each step of each alternative sequence, alternative microcodes may be selected, if necessary, by adding an index to the base address.

Addition of base address and index.

In the signal processor according to the invention each base address defines an associated repertory of microcode addresses, which are distinguished using the index. Given the microcodes needed fur the processing function to be performed by the signal processor, the size of each repertory is prescribed. However, the choice of the base addresses, and of the indices is still free. Also the choice of the type of addition (arithmetic, bit-by-bit logical) is still free. These free choices can be used to adapt the adder 33, the base addresses and the indices to each other, in order to minimize the circuitry needed for the adder and to increase its speed.

In general, it is advantageous that the indices be represented by as few bits as possible. This is because the complexity of the index determining means grows in proportion to the number of index bits. The number of index bits must be at least as large as needed to count the microcodes in the largest repertory. This number of index bits will moreover be sufficient when the indices are chosen to run continuously from zero to a maximum value [0,1,2, . . . max], at least for the largest repertories.

In the most straightforward design, a binary full adder is used. In this case, with indices running from 0 to a maximum, the base addresses can be located at respective addresses spaced from each other by the length of their respective repertories.

This scheme may require carry between the bits of the addresses, causing additional delay between the arrival of the index value and subsequent delivery of the sum. This delay is in the path from the signal data to the microcode address. Therefore, it affects the speed with which the microcode addresses can respond to the signal data, and thereby the overall speed of the signal processor.

The delay may be reduced by choosing the base addresses to be reproduced such that it is ensured in advance that little or no carry occurs during addition. One way of avoiding any carry is by ensuring that at least those bits of the base address which are affected by the addition of any index are zero in the base address. For example, if the possible indices in one repertory are 0, 1 and 2 (3 bit binary representation 000, 001 and 010), carry is avoided if the base address of that repertory ends in 00.

This can be achieved overall by the following exemplary algorithm for allocating the base addresses. First, for each repertory in the cycle the number of least significant bits which may differ from one in the binary representation of the indices is determined. Subsequently, the repertories that require the largest of number of such bits, say N, are allocated evenly spaced base addresses, each with a binary representation in which the N least significant bits are zero. After that, successive repertories which require successively fewer such bits are allocated base addresses, always with an appropriate least significant bits which are zero. The later allocated addresses are located filling in any gaps in the address space left by earlier allocations, if their repertories fit these gaps, and otherwise behind the addresses allocated earlier. These later allocated addresses are also evenly spaced if possible.

For example, suppose five repertories of respectively 6, 5, 2, 2 and 1 indices are needed. The 6 and 5 long repertories require the most, 3, index bits. Therefore one would first allocate addresses 0 and 8 (addresses with 3 zeros in the least significant bits of the binary representation) respectively as base addresses for the 6 and 5 long repertories. This means that the microcode address 0 to 5 and 8 to 12 are occupied, and microcode addresses 6, 7, 13 and higher are still free. The repertories which are 2 long now get the base address 6 and 14 (addresses with 2 zeros in the least significant bits of the binary representation). This occupies microcode addresses 6, 7 and 14, 15; it leaves 13, 16 and higher free. Finally address 13 is given as base address to the one index long repertory.

Many variations on this allocation scheme are possible. For example, one may adapt the index values, by not using exclusively adjacent index values. In this way, one may create a gap in which another repertory may be fitted to achieve a more efficient allocation.

In this or a similar way it is ensured that the addition of the index to the base address does not give rise to a carry. When there is no carry, it suffices to use a simple structure for the adder 33, for example using bitwise OR between the bits of the index and the base address. Evidently other logical operations may be used instead, provided a suitable allocation algorithm is used (e.g. bit wise AND, the base addresses ending in logical "ones" instead of "zeros"; or exclusive ORs). Moreover, since there is no carry, the significance of the bits in the base addresses (that is the power of 2 to which they correspond) has only logical meaning, and need not be reflected for example in the order of addresses in the microcode ROM 3.

Further embodiments of address generation.

Figure 6:
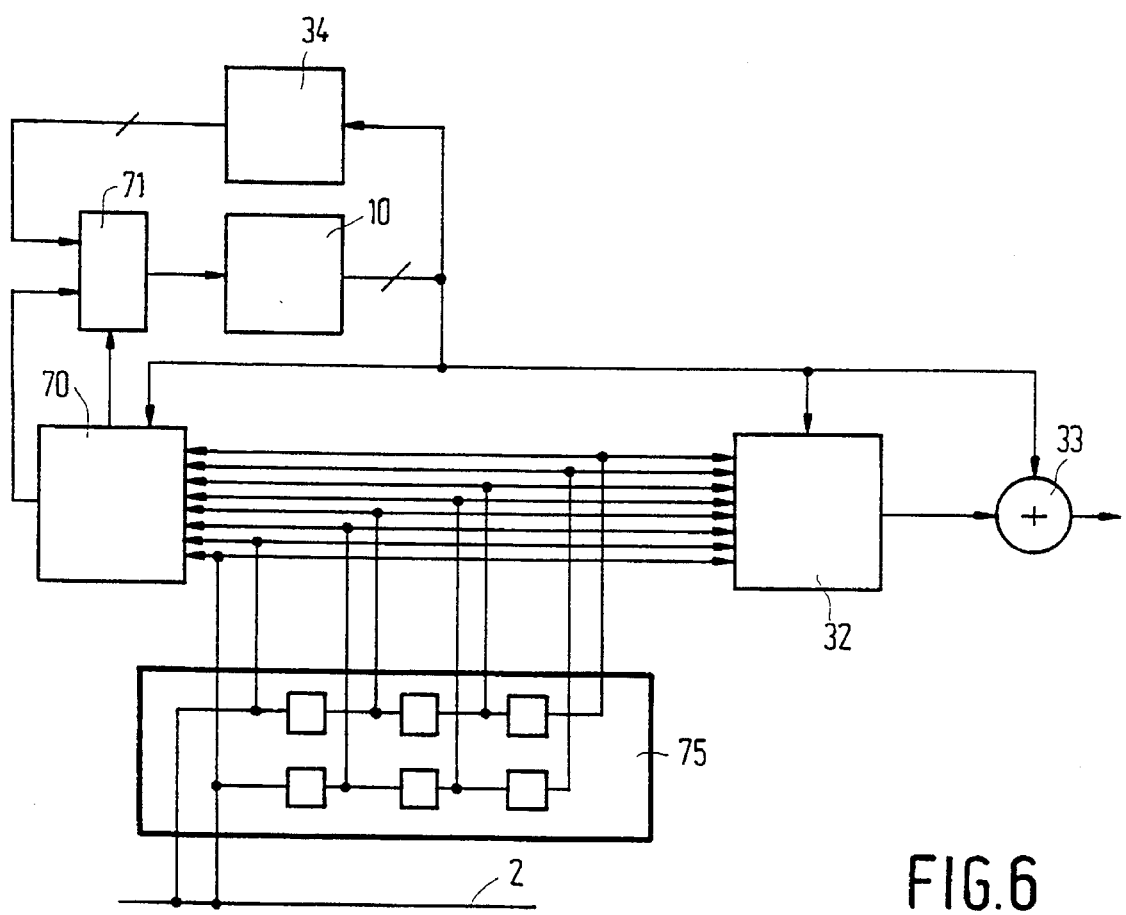
FIG. 6 shows address generating means for a signal processor according to a further embodiment of the invention

FIG. 6 shows a further embodiment of the address generating means, which exhibits several additional features. In the first place, the signal data coming from the processing circuitry are received in a serial in/parallel out shift register 75. This register 75 shifts data under control of the clock (not shown) which also controls the updating of the program count latch 10. As a consequence, the data produced in successive states of the processing circuitry is shifted into the register 75 and presented in parallel to the index determining means 32. In this way, the index may be determined in dependence of signal data from one or more states preceding an actual state of the processing circuitry, as it is made available by the shift register 75. The length chosen for the shift register 75, and therefore the number of clock cycles before data is shifted through the entire register 75, will depend on the type of processing program to be executed.

Of course the shift register 75 need not be limited to accepting only one bit from each state: it may also have a width greater than one, that is, it may have several inputs, for accepting a number of different data signals in parallel and load them into the register 75 in a single clock cycle. As they are shifted to the register 75, these signals may then also be applied in parallel to the index determining means 32.

An alternative to the use of the shift register is the use of memory cells, in which signal data items can be stored mutually independently. In this case, the signal processor contains programmable transfer paths between the processing circuitry to the memory cells and circuitry to select in which memory cell a particular item of signal data is stored. Read out from the memory cells is similar to read out from the shift register. This architecture will require fewer memory cells than a shift register. However, the controllable paths will introduce an extra delay between the arrival of the data signals from the processing circuitry and the production of indices dependent on them. This delay is critical for the reaction speed of the processor.

In the shift register architecture of FIG. 6, this delay is minimized because the processing circuitry 2 is coupled directly to the input of the shift register 75. In particular, at the input, there is no circuitry for programmable selection of signals, because this would introduce additional delays. The input itself may be used directly as one of the parallel outputs.

A further feature shown in FIG. 6 concerns the selection of the next value of the program count which is not exclusively under control of the next base address generating means 34. Instead, selection occurs via a multiplexer 71. The address generating means moreover contain conditional starting means 70. In dependence of the signal data, and under control of the base address, these starting means may generate a starting address, and control the multiplexer to load this starting address into the program count latch 10, instead of the next base address.

Figure 7:
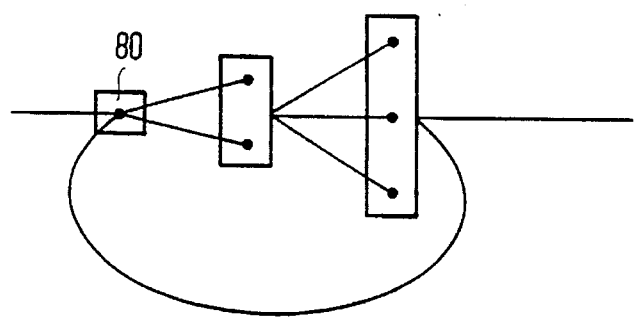
FIG. 7 shows a further state diagram.

This is useful for initialization of the program counter latch or for the implementation of program loops, such as illustrated in FIG. 7. This Figure shows a state diagram containing a loop. Here the sequence of base addresses is made to repeat itself a number of times. This is achieved by loading the base address which corresponds to the loopback state 80 in to the program count latch 10. This base address is generated by the conditional starting means.

It will be clear that the additional feature shown in FIG. 6 (the use of a shift register to transfer signal data to the index determining means, selection of next base addresses using a multiplexer and, optionally, the conditional starting means) can be used either separately or in combination (as shown in FIG. 6).

From the description given above, it will be clear that, by the use of microcode selecting means, a standard address sequence may be used to control a signal data dependent sequence of microcodes. For signal processing, use of a standard sequence will considerably reduce the amount of circuitry required for the determination of microcode addresses.

It shall be clear that the embodiments of the invention given by the Figures and the description should not be construed as limiting the invention. For example, although a microcode ROM 3 was discussed, this circuit may be replaced by any circuit that produces a preprogrammed output in response to an address input: its function may be for example performed using a programmable logic array or a programmable read only memory. One may even use a random access memory, particularly when the signal processor must be reprogrammable. Similar design choices are open for the index determining means 32, the next base address determining means 34, and the conditional starting means 70. In most signal processors, particularly for consumer equipment, however, the function of the signal processor will be fixed in the design phase, and one may use dedicated circuitry, such as ROMs or PLAs, and also shift registers 75 with dedicated length and width.

For most purposes, the signals processed by the processing circuitry will be represented by digital signals, each comprising a number of bits as appropriate for the required operation. It shall be clear, however, that the invention, which concerns primarily the control circuitry and not the processing circuitry itself, can also be applied when analogue, time discrete processing circuitry is used (which for example stores sampled signals as charges on capacitances), with analogue to digital conversion between the processing circuitry and the index determining means for controlling the latter.

We claim:

1. A time-discrete signal processor comprising a signal input for receiving a stream of signal units, address generating means for, in step with reception of each particular signal unit, generating an associated cycle of microcode addresses MA(i) (i=1, . . . );

processing circuitry for processing the signal units;

a microcode store for supplying microcodes for controlling the processing circuitry, characterized, in that the address generating means comprise base address producing means, for, in response to each signal unit, reproducing a standard sequence of successive base addresses BA(i) (i=1. . . N), which standard sequence is independent of the signal units and is the same for each signal unit, which base address producing means is arranged for feeding the base addresses BA(i) to microcode selecting means for selecting, in step with each base address and under control of signal data received from the processing circuitry, an associated microcode address MA(i) from a repertory of microcode addresses indicated by the base address BA(i).

2. A time-discrete signal processor according to claim 1, characterized, in that the microcode selecting means comprise index selecting means, for selecting, under control of the signal data, an associated index IA(i), and index adding means, for adding the base address BA(i) and the selected associated index IA(i), a sum output of the index adding means being arranged for feeding the microcode addresses MA(i)=BA(i)+IA(i) to the microcode store.

3. A time-discrete signal processor according to claim 2, characterized, in that the index selecting means are arranged for selecting the associated index IA(i)=F(data,BA(i)) under co-control of its base address BA(i).

4. A time-discrete signal processor according to claim 3, characterized, in that it comprises class identifying means, arranged for forming with each reproduced base address BA(i) an associated class signal CL(BA(i)), identifying a class to which said base address belongs, the class signal determining said co-control IA(i)=F(data,Cl(BA(i))).

5. A time discrete signal processor according to claim 2, characterized, in that in it, the base addresses are all represented digitally by a number of basebits, the indices all being represented by a number of indexbits, the number of index bits being smaller than the number of base bits.

6. A time-discrete signal processor according to claim 1, characterized, in that the base address reproducing means comprise a chaining store and a feedback coupling from an output of the chaining store to a chaining address input, whereby each base address selects its successor base address, if any.

7. A time-discrete signal processor according to claim 2, characterized, in that the index adding means comprise an adder circuit with restricted carry.

8. A time-discrete signal processor according to claim 7, characterized, in that the adder circuit is a carry free adder circuit.

9. A time-discrete signal processor according to claim 1, characterized, in that it comprises serial in/parallel out shift register means, with a shift input having a fixed preprogrammed coupling to the processing circuitry, for serially receiving processed signals, the shift register means having a parallel output coupled to the index adding means.

10. A time-discrete signal processor according to claim 6, characterized, in that the feedback coupling is arranged for feeding the microcode addresses BA(i)+IA(i) to the chaining address input.

11. A time-discrete signal processor comprising:

a signal input for receiving a stream of signal units, which signal units define a time-dependent sequence of sets of signal processing states, each set comprising at least one state, each state being dependent on a previous state, each set of states containing states occurring at a same respective time within the sequence;

a microcode store for storing instructions for controlling processing circuitry for processing the signal units;

address generating means for generating addresses for the microcode store comprising means for generating a standard sequence of base addresses, in response to each signal unit, each base address specifying one of the sets of states, which standard sequence is independent of the signal units and is the same for each signal unit; and means for generating a state-dependent index for selecting a state within the set specified by a current base address, and means for adding the index to a current base address.

12. A method for processing signal data comprising the steps of receiving a plurality of signal units;

for each signal unit received, generating a cycle of base addresses for addressing a microcode store, each base address in the cycle being solely dependent on a previous base address, the cycle of base addresses being independent of the signal units and being the same for each signal unit;

addressing a microcode store using the base addresses and corresponding optional indices;

processing the signal units using microcodes supplied by the microcode store in response to the addressing step; and within the cycle, generating the corresponding optional index for a next microcode based on a result of the processing step for a current microcode.

13. The processor of claim 1, wherein the standard sequence comprises a plurality of distinct base addresses.

14. The processor of claim 11, wherein the standard sequence.

15. The method of claim 12, wherein the cycle comprises a plurality of distinct base addresses.

\* \* \* \* \*